April 27, 1943. J. ARMSTRONG 2,317,429
CONNECTING ROD CONNECTIONS WITH PISTON AND CRANK-SHAFT
Filed Sept. 5, 1941 3 Sheets-Sheet 2

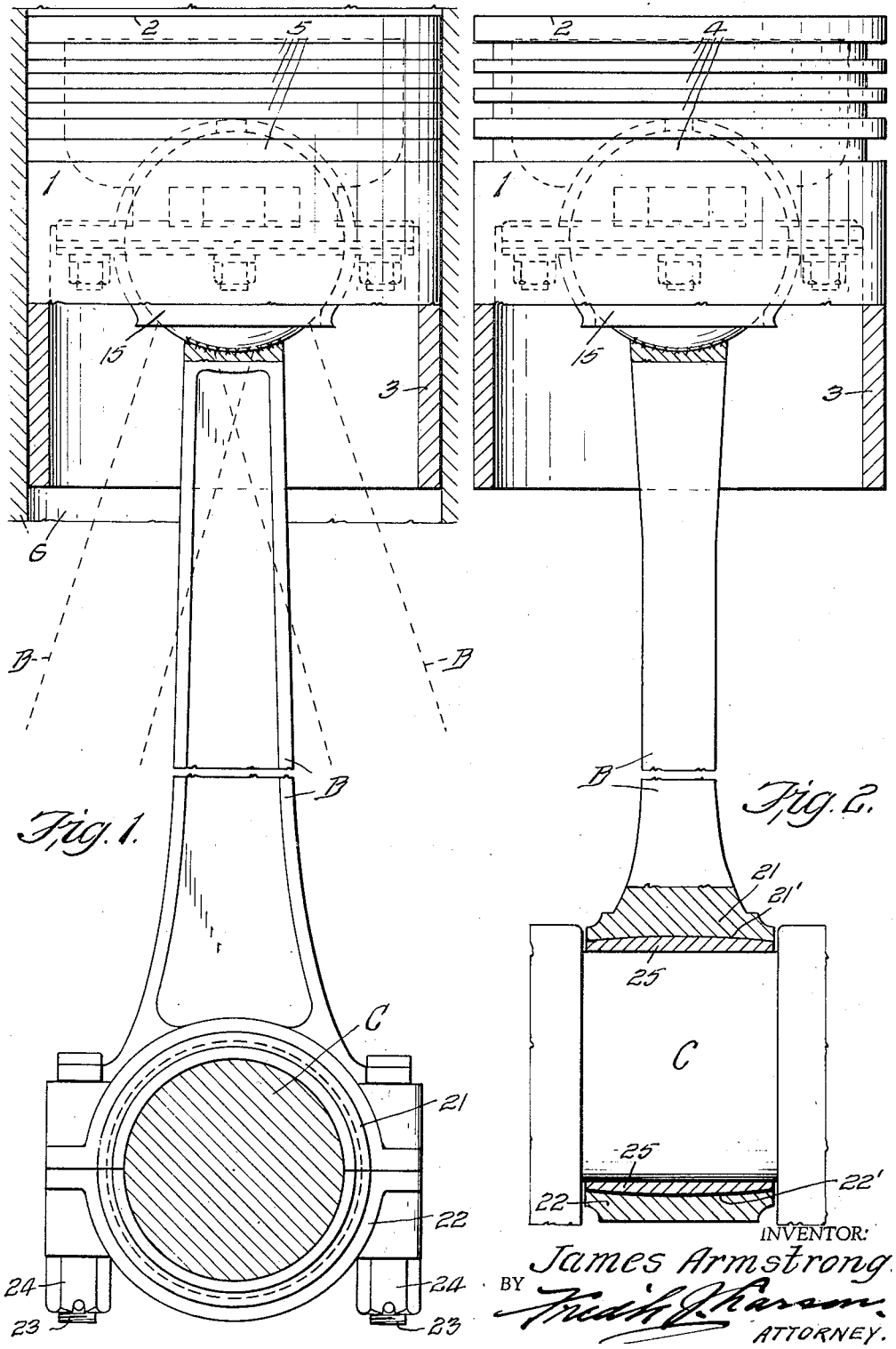

INVENTOR.
James Armstrong.
BY
ATTORNEY.

April 27, 1943. J. ARMSTRONG 2,317,429
CONNECTING ROD CONNECTIONS WITH PISTON AND CRANK-SHAFT
Filed Sept. 5, 1941 3 Sheets-Sheet 3

INVENTOR:
James Armstrong.
BY
ATTORNEY.

Patented Apr. 27, 1943

2,317,429

UNITED STATES PATENT OFFICE 2,317,429

CONNECTING ROD CONNECTION WITH PISTON AND CRANKSHAFT

James Armstrong, St. Louis, Mo.

Application September 5, 1941, Serial No. 409,706

9 Claims. (Cl. 309—20)

My invention relates to connecting-rod connections with pistons and crank-shafts of internal combustion motors.

The object of my present invention is the provision of means whereby universal movement is established between the connecting-rod and the piston at one end thereof and between the connecting-rod and the crank-shaft at the other end thereof.

A further object of the invention resides in the provision of connection between the connecting-rod and the piston at one end thereof and between the connecting-rod and the crank-shaft at the other end thereof which allows for uniform wear of the piston in the cylinder of the motor and thereby eliminating uneven wearing of the piston skirts as a universal connection is provided for the connecting-rod.

A further object of the invention resides in the provision of a universal joint connection between the connecting-rod and the piston that is hollow and therefore comparatively light weight construction.

A further object of the invention resides in the provision of a connection between the connecting-rod and the piston that will afford approximately four times the bearing surface, according to piston size, that wrist-pin connections will afford.

A further object of the invention resides in a simple, efficient construction of connection between the connecting-rod and piston that will have greater resistance to heat concentration, at the connection, than a wrist-pin connection.

A further object of the invention resides in the use of a comparatively light piston with no wrist-pin bosses, thereby reducing heat concentration at the connection, which is hollow between the connecting-rod and the piston.

A further object of the invention resides in the provision of an insertable bearing between the connecting-rod and the crank-shaft and having a longitudinal surface scribed by an arc from the center of the connection between the upper end of the connecting-rod and the piston, and thereby providing a universal connection between the connecting-rod and crank-shaft to compensate for end play of the crank-shaft.

With the above and other objects and advantages in view, as will become more apparent hereinafter, the invention consists in the novel features of shape, construction, arrangement and combination of parts described in the following specification, illustrated in the drawings, and finally pointed out in the claims hereto appended.

Referring to the drawings:

Fig. 1 is an elevational view, partly in vertical cross-section, of the connections between the connecting-rod and piston and the connecting-rod and crank-shaft, embodying the features of my invention.

Fig. 2 is an elevational view similar to Fig. 1, but at a right angle thereto, and clearly illustrating the connection between the connecting-rod and the crank-shaft.

Figure 3:
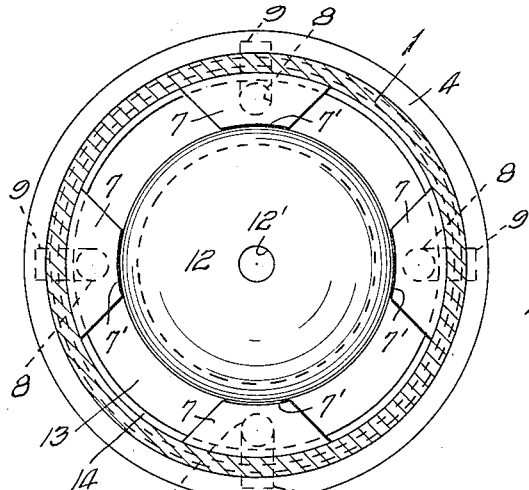
Fig. 3 is a horizontal sectional view taken on a line through one of the piston ring grooves above the connection between the connecting-rod and the piston.

Referring to the drawings, in detail, the reference numeral 1 designates a piston having a head 2 and a suitable depending skirt 3, the upper end portion of which is provided with the usual ring grooves 4 adapted to receive suitable piston rings 5 slidably engageable with the inner wall of a motor cylinder 6. The piston rings and a part of an engine cylinder are shown in Fig. 1.

Figure 9:
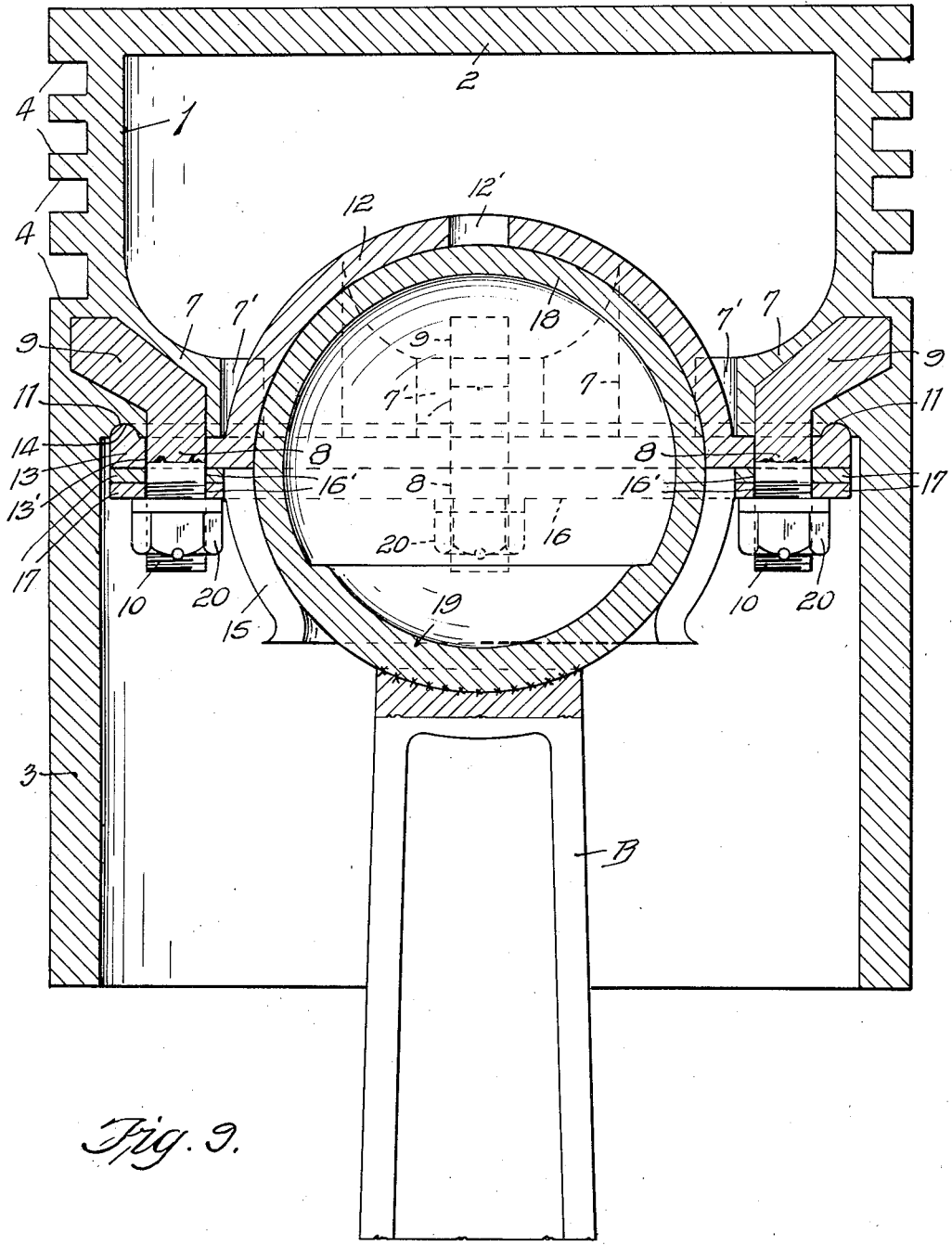
Fig. 9 is an enlarged vertical sectional elevation of the piston and the connecting-rod head bearing connection therebetween.

A plurality of lugs 7, preferably four in number, as shown in Fig. 3, although not necessarily so, are evenly spaced apart circumferentially, and shown as projecting inwardly a short distance from the skirt adjacent the lower piston ring groove, as clearly apparent in Fig. 9. The inner ends of the lugs 7 are likewise spaced apart and curved inwardly on their inner faces, as at 7', thereby providing a large space or circular opening between the inner ends thereof, whether in opposed relation, as illustrated, or arranged in some other manner. A suitable stud member 8 provided at its upper end with an angularly disposed head 9, is employed with each lug 7. The heads 9 are embedded in the lugs 7 and the studs 8 depend therefrom to a point below the lugs. The studs 8 are screw-threaded, as at 10, at their lower end portions. The lower face of each lug 7 is surfaced, or finished, and is provided with an arcuately shaped groove 11 to the outside of each depending stud 8, as clearly shown in Fig. 9. The above arrangement provides a comparatively light piston and one which is efficiently and effectively balanced.

Cooperating with the piston is a wholly detachable connecting-rod bearing, which will now be described.

Briefly, the bearing includes an upper cap member and an independent lower retaining cap member which is separable.

Figure 5:
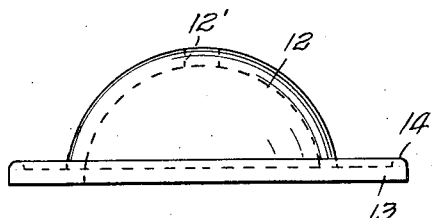
Fig. 5 is a side elevation of the bearing member shown in Fig. 4.

Referring to Figs. 5 and 9, the upper cap member includes a semi-spherical body 12 having a suitable lubricant opening 12' and providing a semi-spherical socket open at its lower end. An annular flange 13 having stud openings 13' projects outwardly from the lower edge of the body 12 and is of a diameter slightly less than the inner diameter of the piston skirt to provide oil drain passage, as clearly apparent in Fig. 9. A suitable annular upstanding bead 14 is formed at the peripheral edge of the body flange 13, which is adapted to be receivable and seated in the grooves 11 in the lower face of the internal piston lugs 7. The diameter of the cap body 12, at its base, occupies the major part of the space within the piston skirt, minus only a little more than the space occupied by the lugs, thereby providing for a comparatively large bearing, as will be clearly apparent from Fig. 9, to accommodate a large diameter connecting-rod head hereinafter fully described. The body 12 is suitably separated from the head, skirt and lugs on the piston skirt, as clearly apparent in Fig. 9, thus the only transmission of heat direct thereto must come through the body flange 13 from the four point contact of the flange with the lugs 7, which lugs in themselves are comparatively small in size, thus transmitting but a small amount of heat at spaced intervals to the flange 13 of the upper cap member.

Figure 6:
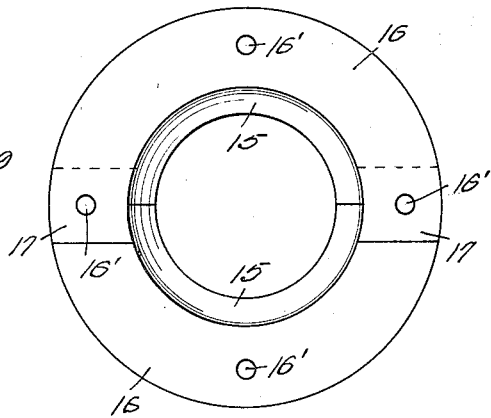
Fig. 6 is a top plan view of the lower half of the apertured separable bearing member receiving the major portion of the lower half of the connecting-rod head.
Figure 4:
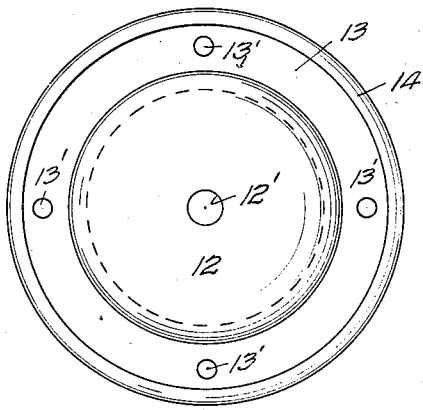
Fig. 4 is a top plan view of the upper half of the bearing member receiving the upper half of the hollow connecting-rod head.
Figure 7:
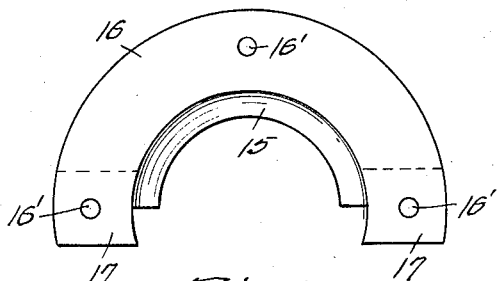
Fig. 7 is a top plan view of one-half of the separable bearing member.
Figure 8:
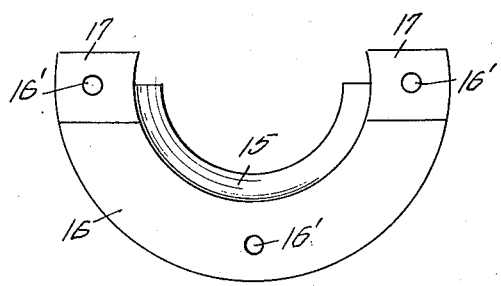
Fig. 8 is a top plan view of the other half of the separable bearing member.

To complete the bearing referred to, I employ a separable lower cap member, as shown in Fig. 6. The lower cap member includes a separable hollow, or ring-like body member, which is open at both its upper and lower ends, when assembled, as shown in Figs. 6 and 9. The lower opening is smaller in diameter than the upper opening. The inner face of the lower cap member corresponds in shape to the inner face of the upper cap member to provide what would be a spherical socket were the bottom of the lower cap member not provided with an opening. The separable lower cap member is clearly shown as assembled in Fig. 6 and separated in Figs. 7 and 8.

As shown in Fig. 6, when assembled, the lower cap member includes two semi-circular body portions, or segments, designated 15. A flange 16 having stud openings 16' projects outwardly from the upper edge of each lower cap body segment 15, which, when the two body segments 15 are assembled, form a circular, or annular flange. The ends 17 of each flange 16 project beyond the ends of the semi-circular body segments 15, as clearly shown in Figs. 7 and 8, and they are reduced in thickness so as to overlap one another when assembled, as shown in Fig. 9.

The connecting rod B can be of any suitable construction. A hollow spherical head 18 formed of suitable material and of suitable wall thickness is suitably secured to the upper end of the connecting-rod B such, for instance, as by welding, or any other well known method of uniting same. The lower half of the spherical head 18 has a portion of its wall thickened, as at 19, serving to counter-balance the head 18 and also to reinforce the same.

The upper half of the head 18 is receivable in the semi-spherical bearing, or upper cap member 12, which serves to form a semi-spherical socket to receive the connecting-rod head 18. The separable lower retaining cap members 15 serve to form a continuation of the socket to retain the head 18 in the socket so formed. When the upper semi-spherical cap members 12 and the lower separable retaining cap members 15 are assembled to form the socket for the connecting-rod head 18, the studs 8 pass through the openings 13' and 16' in the flanges 13 and 16, respectively, of said members and the socket bearing members are held in operative relation and in fixed position within the piston by means of nuts 20 carried by the screw-threaded ends of the studs 8, thus holding the bead 14 on the flange 13 of the upper cap member 12 in the lug grooves 11. The beaded flange 13 of the upper cap member 12 serves with the cap member to provide a lubricant trough or oil overflow channel due to its spaced relation with the piston wall and so that the constantly overflowing oil can serve as a cooling agent to aid in maintaining the cap material at a lower temperature than the piston wall.

The lower end of the connecting-rod B is of usual form, or construction, having the split bearing formed by the upper semi-circular cap portion 21 integral therewith, and the lower semi-circular retaining member 22 held in position by means of the nuts 23 carried by the studs 24.

The inner faces of the members 21 and 22 are suitably and longitudinally curved, or concaved, and designated 21' and 22', as shown in Fig. 2, thus providing a bowed barrel shaped space surrounding the crank-shaft C. A suitable insert bearing 25, preferably of the split type, is disposed in the space between the split lower bearing on the connecting-rod B and the crank-shaft C. The split insert bearing 25 is full floating and is employed to compensate for the end play in the crank-shaft C allowing forward and backward action of the crank-shaft without binding the universal joint action of the connecting-rod with relation to the crank-shaft. The split insert bearing 25 has its outer face curved to correspond to the curvature of the inner face of the lower connecting-rod members 21 and 22 and this curvature is scribed in the form of an arc using the center of the hollow spherical head 18 on the connecting-rod B as a center, thus a universal joint connection is formed between the lower end of the connecting-rod B and the split insert bearing floating on the crank-shaft C, which connection cooperates with the universal joint connection between the upper or head end of the connecting-rod B and the piston.

What I claim is:

1. An upper socket member for pistons of the class described, said socket member having an outstanding flange at its lower edge, and an annular upstanding bead formed at the peripheral edge of the flange.

2. A connecting-rod bearing including a hollow cylindrical piston, a plurality of spaced internal lugs on the piston, said lugs having arcuately shaped inner end faces, the lower faces of the lugs being finished and provided with arcuate grooves in circumferential alignment, a semi-spherical bearing member extending upwardly between the lugs but out of contact with the arcuate inner faces of the lugs, a flange on the bearing member engaging the lower faces of the lugs, a bead on the flange seated in said recesses, a connecting-rod having a hollow spherical head half disposed in said semi-spherical bearing member, separable means for holding the hollow spherical head against said semi-spherical bearing member, and means for locking the semi-spherical bearing member and the separable means against displacement.

3. An internal combustion engine piston provided with a semi-spherical socket member having an annular base flange with its free edge spaced from the skirt of the piston, a connecting-rod having a hollow ball shaped head that fits the socket, a separable retaining cap having a marginal flange with its free edge spaced from the skirt of the piston, and an upstanding marginal bead on the flange of the socket member to provide an oil overflow channel at the base of the semi-spherical socket member.

4. An internal combustion engine piston provided with four equally spaced lugs having underface grooves projecting inwardly from the wall of the piston and having their lower plane surfaces substantially in a line with what would be the wrist pin axis of the wrist pin type of pistons, a semi-spherical upper bearing member, an annular outstanding flange at the base of said bearing member, an upstanding bead at the free edge of said flange receivable in said lug grooves to provide an oil overflow channel between the lugs, and said bead being spaced from the inner face of the side wall of the piston to provide an oil passage therebetween.

5. A piston comprising a hollow cylindrical member having a closed upper end and provided with the usual ring grooves, a plurality of opposed equally spaced interior lugs providing spaces therebetween, the inner free faces of the lugs being inwardly curved to provide a circular opening between the lugs, a socket member extending upwardly through said opening and free from contact with the curved faces of the lugs, the lower faces of the lugs being finished surfaces and provided with arcuately shaped groove, an outstanding flange on the socket member, a bead on the flange engaging in said groove, and the free edge of said flange being spaced from the inner face of the side wall of the piston to provide oil passages for oil overflowing from a channel formed by beading the outstanding flange.

6. In combination with a piston, connecting-rod and a crank-shaft, a ball and socket bearing connection between the connecting-rod and the piston, the upper member of the ball and socket joint having an outstanding annular flange, an upstanding marginal bead on the flange to provide an annular lubricant overflow channel adjacent the base of the upper member, and two sets of opposed piston lugs having underface grooves adapted to receive corresponding portions of the said bead, and means for removably securing the ball and socket bearing to the lugs on the piston with the free flange edge thereof spaced from the side wall of the piston to provide oil drain passages.

7. In combination with a piston and a connecting-rod having a hollow ball head, a separable spherically shaped socket bearing for the ball head of the connecting-rod, said bearing having an outstanding flange provided with an upstanding marginal bead, two sets of oppositely arranged lugs cast on the inside wall of the piston, said lugs having lower facial grooves to receive corresponding portions of the bearing flange bead, and means for securing the socket bearing flange to the grooves faces of the lugs.

8. In combination with a piston and a connecting-rod, a hollow ball head on the connecting-rod, said piston having two sets of oppositely arranged lugs cast with the side wall of the piston and disposed at 90 degree angles to each other, a removable bearing for the hollow ball head of the connecting-rod, said bearing having a semi-spherical central portion and an outstanding endless flange provided with an upstanding marginal bead to provide a lubricant overflow channel surrounding the base of the said semi-spherical central portion, the free outer edge of the flange being spaced from the wall of the piston to provide oil drains, a separable bearing cap open at opposite ends and each segment of the cap having an outstanding flange reduced in thickness at its end portions, the end portions of the cap flanges projecting beyond the semicircular dimensions thereof and overlapping each other, and means for removably securing the flanges of the removable bearing and the flange of the bearing cap to the lugs so as to underlie the same with the bead of the removable bearing flange seated in the grooves in the piston lugs.

9. A device of the class described for internal combustion motors having, in combination, a piston, a connecting-rod, a removable separable spherical bearing except for a connecting-rod opening therein, four equally spaced lugs having lower-face grooves within the piston, said bearing having an outstanding flange and an upstanding marginal bead providing thereby an oil overflow channel, a hollow ball shaped head on the connecting-rod receivable in the spherical bearing and being internally counterbalanced.

JAMES ARMSTRONG.